Dec. 9, 1969  E. C. PICKARD  3,482,851
STANDARDBRED RACING BIKE
Filed Oct. 31, 1968  4 Sheets-Sheet 1
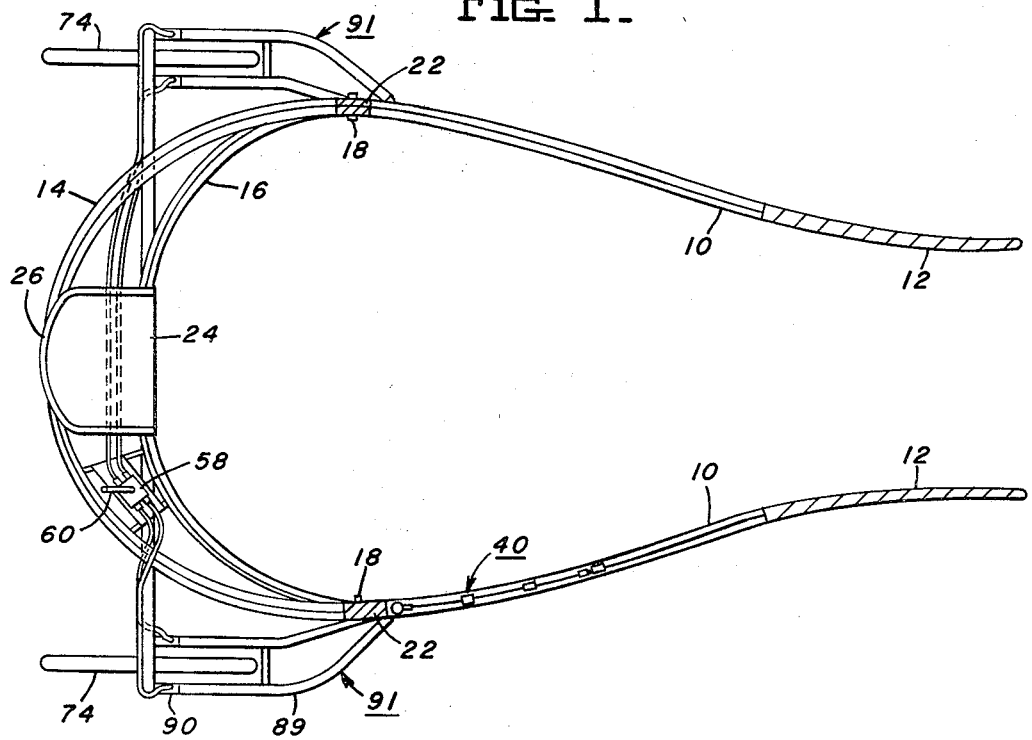
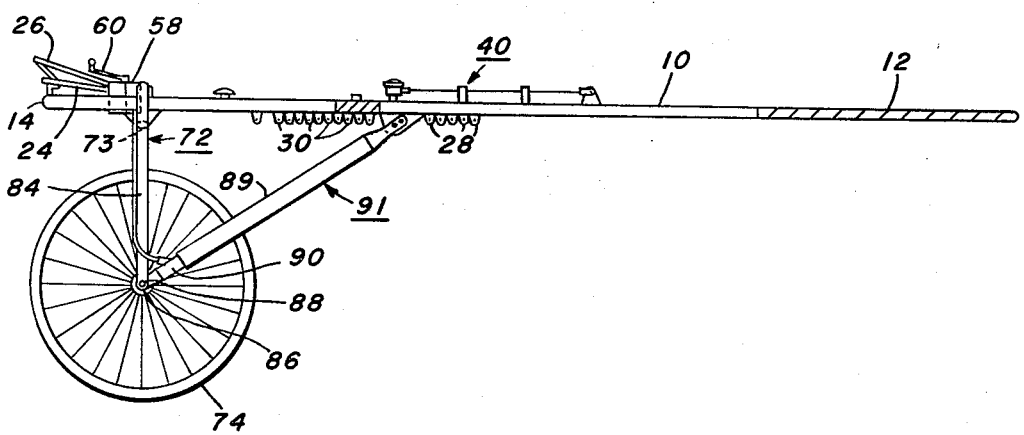
INVENTOR.
EDGAR C. PICKARD
By
Murray & Linkhauer
Attorneys

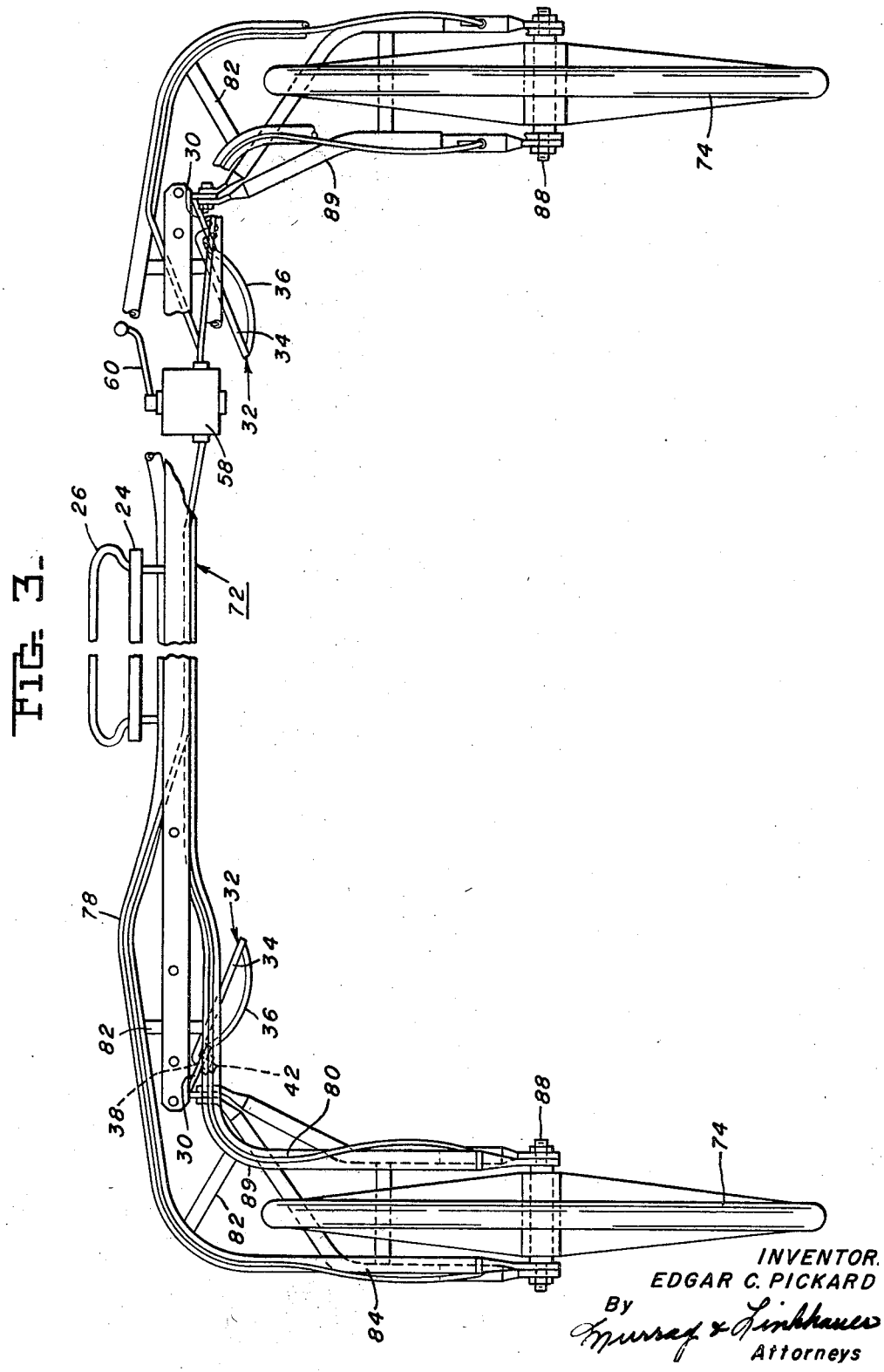

Dec. 9, 1969　　　　　E. C. PICKARD　　　3,482,851
STANDARDBRED RACING BIKE
Filed Oct. 31, 1968　　　　　　　　　　4 Sheets-Sheet 3
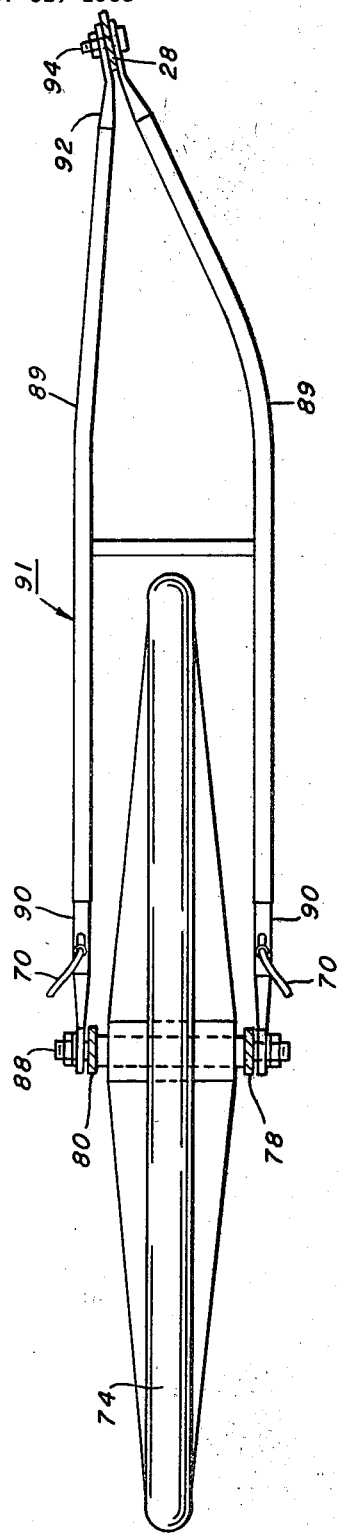
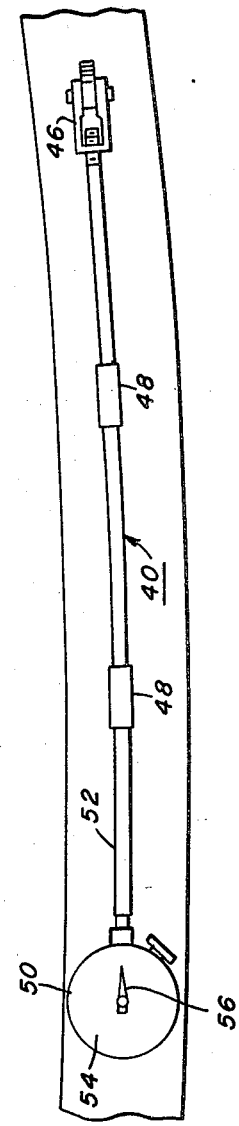
INVENTOR.
EDGAR C. PICKARD
By
Attorneys Dec. 9, 1969  E. C. PICKARD  3,482,851
STANDARDBRED RACING BIKE
Filed Oct. 31, 1968  4 Sheets-Sheet 4
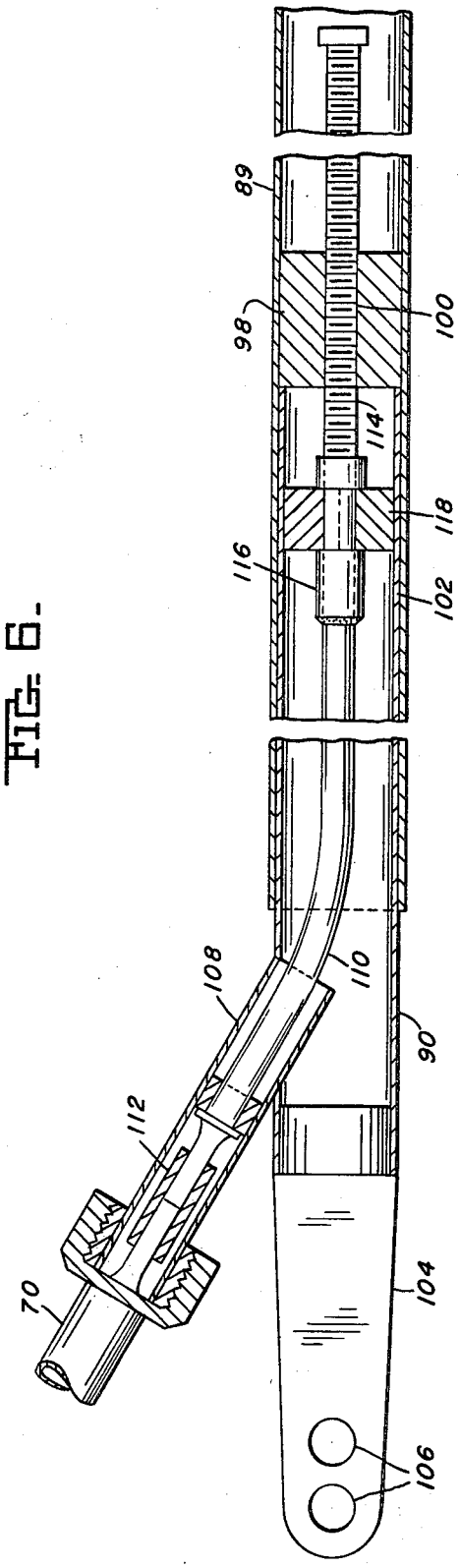
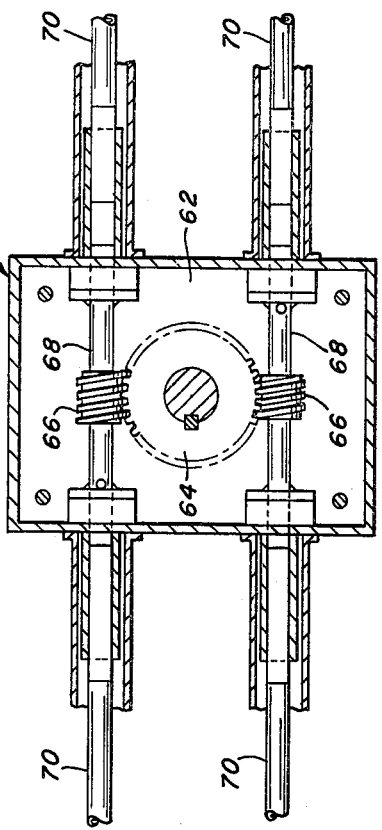
INVENTOR.
EDGAR C. PICKARD
By
Murray & Linkhauer
Attorneys () 3,482,851
STANDARDBRED RACING BIKE
Edgar C. Pickard, Valparaiso, Ind.
Continuation-in-part of application Ser. No. 636,144,
May 4, 1967. This application Oct. 31, 1968, Ser.
No. 772,134
Int. Cl. B62c 1/08
U.S. Cl. 280—63          5 Claims

ABSTRACT OF THE DISCLOSURE

A standardbred racing bike having an articulated construction which permits the position of the driver to be changed with respect to the axle. The adjustment is made with the use of a pair of bifurcated struts of adjustable length associated with each wheel of the bike, one on each side of each wheel and operated remotely through a flexible cable. The bike of the invention also has a strain gage on one of its shafts to permit detection of the force exerted by the shafts on the horse pulling the bike. A bike with this combination and features will give good performance with a variety of different horses and drivers. The use of a pair of adjustable length members with each wheel overcomes the problem of having the wheel turned in or out when the adjustable length means is operated. Finally, the articulated construction makes possible the use of larger wheels, thereby lessening the required pulling force.

CROSS-REFERENCES TO RELATED APPLICATIONS

This application is a continuation-in-part of my copending application Serial No. 636,144, filed May 4, 1967.

BACKGROUND OF THE INVENTION (1) Field of the invention.—This invention relates to two-wheeled land vehicles, and in particular to racing bikes for use in harness racing of horses.

(2) Description of the prior art.—U.S. Patent No. 507,839 discloses a racing bike having an articulated construction such that the position of the driver may be adjusted with respect to the axles passing through the wheels. With the racing bike of this patent, however, the intention is that the driver be positioned directly above the axle passing through the wheels. No means are provided for adjusting the position of the driver with respect to the wheels while the vehicle is in use, nor is any means provided for enabling the position of the driver's seat to be adjusted in accordance with the forces exerted by the shafts of the vehicle, upward or downward, upon the horse.

U.S. Pat. No. 2,896,962 discloses a sulky having an adjustably positioned seat, such that the forces exerted upon the horse by the shafts may be changed. Again, however, no means is provided for making any such adjustment while the vehicle is in use, nor are means provided for determining the degree of adjustment that might be required for optimal performance.

BRIEF SUMMARY OF THE INVENTION

This invention relates to a standardbred racing bike of novel construction. A strain gage is positioned on one of the shafts to detect upward or downward deflection of the end of the shaft nearest to the horse; and means are provided for adjusting the position of the center of gravity of the driver with respect to the axle, in accordance with the indication of the strain gage. This makes it possible to adjust the upward or downward thrust upon the horse to a value most favorable for obtaining good time.

To this end, there is provided in accordance with the invention a racing bike of articulated construction, having a first portion containing the shafts that are connected to the horse and a second portion containing the axle upon which the wheels of the racing bike turn. Connecting the two, in addition to a pivot means, are bifurcated struts of adjustable length that are operable from the driver's seat, even during the progress of a race. Each strut is provided with two legs of adjustable length, one on each side thereof, and both operable from a common means, so that they act in synchronism and do not tend to cause the wheel to be toed either in or out. As explained hereinafter, however, the struts provide for a way of adjusting the degree of toe-in or toe-out of the wheel involved. The articulated construction enables, moreover, the use of wheels of greater exterior diameter, thereby lessening the pulling force that is required of the horse.

BRIEF DESCRIPTION OF THE DRAWINGS

A complete understanding of the invention may be obtained from the foregoing and following description thereof, taken together with the accompanying drawings, in which:

FIGURE 1 is a plan view of a racing bike made in accordance with the instant invention;

FIG. 2 is a side elevation view of the racing bike of FIG. 1;

FIG. 3 is an end elevation view of the racing bike of FIG. 1;

FIG. 4 is a partial plan view, showing a portion of the apparatus of FIG. 1;

FIG. 5 is a fragmentary plan view, showing another portion of the apparatus of FIG. 1;

FIG. 6 is a detailed view, showing a portion of the apparatus of FIG. 2; and

FIG. 7 is a plan view, showing in further detail a portion of the apparatus of FIG. 1.

DESCRIPTION OF THE PREFERRED EMBODIMENTS

Referring to the drawings, and particularly to FIG. 1 and 2, the racing bike shown comprises a pair of spaced shafts 10, preferably but not necessarily suitably tapered to minimize wind resistance, and provided with leather coverings 12 in the vicinities of their forward ends. It will be understood that the shafts 10 are somewhat flexible, tending to bow upward at their centers if they exert a substantial upward thrust on the horse and downward if the shafts are exerting a substantial downward thrust upon the horse. The shafts 10 terminate in a U-shaped portion 14 at their rear ends, within which there is positioned a U-shaped member 16, secured at its ends to the shafts 10 by means of bolts 18. In the vicinity of the bolts 18, there are provided leather overwrappings 22. Mounted between the portion 14 and the member 16 is a seat 24 having a seat rail 26. The shafts 10 are also provided on their undersides with brackets 28 and 30 (FIG. 2) that serve purposes hereinafter to be described.

As best seen in FIG. 3, the racing bike of the invention is provided with adjustable stirrups 32 comprising generally straight parts 34 and an arcuate part 36, the generally straight parts 34 having threaded projections 38 which fit through adjacent ones of the holes in the brackets 30 and receive nuts 42 to secure the stirrups 32 in place. As shown in FIG. 3, the brackets 30 are bent inwardly of the shafts 10, for example, to within about 13° of horizontal.

Mounted on the upper side of the shafts 10 is a balance-detection system indicated generally at 44 in FIGS. 1 and 2 and shown in detail in FIG. 4. This comprises a fixed support 46, a number of intermediate fixed supports 48 of tubular shape, a strain gage element 50, and a rod or wire 52 running from the fixed support 46 through the tubular intermediate supports 48 and terminating at the strain gage element 50 which has a dial 54 upon which there is indicated by means of a pointer 56 the extent of upward or downward bowing of the shafts 10.

Mounted next to the seat 24 between portion 14 and member 16 is a box 58 (FIGS. 1–3), from which there extends a crank handle 60. The box 58 contains a transmission 62 (FIG. 7) comprising a central gear 64 and planetary helical gears 66 that are arranged to rotate shafts 68 that are connected to cables 70. The cables 70 are flexible cables, like speedometer cables, and serve a purpose to be hereinafter more fully described.

There is further provided the portion 72 (FIGS. 2 and 3) of the racing bike that bears the wheels 74. Portion 72 is hingedly joined, as at 73 (FIG. 2), to the remainder of the racing bike in such manner that the position of the driver with respect to the wheels can be adjusted in a manner to be hereinafter more fully described. Portion 72 comprises a main frame which is generally in the form of an inverted U and made of two pieces 78 and 80 of tubing provided with suitable braces or spacers 82. In the legs 84 of the main frame, there are provided one or more openings 86 (FIG. 2), in which there is placed an axle 88 about which the wheels 74 revolve. Positioned between the axles 88 and the bracket 28 are struts 91 of adjustable length comprising tubular elements 89 having elements 90 telescopically received therein. The manner of operation of elements 89 and 90 will be explained below with reference to FIGS. 5 and 6. As seen in FIG. 5, the strut 91 is joined at its forward end 92 to a bracket 28 by suitable fastening means, such as nut and bolt 94. The strut 91 is bifurcated and provided with two of the tubular elements 89 within each of which there is welded or otherwise secured a block 98 (FIG. 6) that is internally threaded, as at 100. Slidingly engaged within the tubular element 89 is a tubular portion 102 of the element 90; and this is connected, at its rear end, to a portion 104 containing one or more holes 106, through which may be passed the wheel axle 88. Communicating with the tubular portion 102 is a tubular member 108 that contains a flexible cable 110, fastened at its one end by suitable means, 112, to a cable 70 and at its other end to a bolt 114 passing through the internal threads 100 of the block 98. As shown, the bolt 114 and cable 110 are joined by means of a fitting 116 on one side of a block 118 welded or otherwise secured to the interior of the tubular portion 102 and through which the bolt 114 passes. The elements 90 and 89 are thus kept in spaced relation to each other, in accordance with the number and direction of revolutions executed by the flexible cable 70.

As can be seen from FIGS. 5 and 6, associated with each wheel 74 are two of the elements 90, one on each side thereof. With reference to FIGS. 1 and 7, the cables 70 operate simultaneously when the crank 60 is turned to move both elements 90 of a strut 91 into or out of tubular elements 89, not only the two associated with one of the wheels 74 but also the two associated with the other one of the wheels 74. This takes place because the pairs of cables 70 leading to the elements 90 associated with a given one of the wheels turn, when the crank 60 is turned, in opposite senses. It will be appreciated, moreover, that the structure herein shown has the advantage that the adjustment in length is made without imparting to either of the wheels 74 any tendency to be turned inward or outward, as would be the case if there were used with respect to a given one of the wheels 74 an individual member of adjustable length that was not exactly aligned with a plane passing through the periphery of the wheels 74.

If it is desired to correct the degree of toe-out or toe-in of one of the wheels 74, it will be possible to disconnect a cable 70 from the connector 112 that is associated with the length adjustment means on an appropriate side of the wheels 74, turn the crank 60 and appropriate amount, and reconnect the flexible cables 70 and 110 through the connector 112, bringing the wheels 74 to a desired position, usually one directly parallel to the intended path of travel of the racing bike.

It is a further feature of the invention that the use of apparatus comprising bifurcated struts of adjustable length and an articulated construction between one portion of the racing bike having the shafts and a second portion having the wheels, makes it possible to use on the racing bike wheels of larger diameter, such as 30 inches, in place of the 26-inch and 28-inch wheels that have hitherto been used. Using a larger wheel decreases the pulling force that is required of the horse. This tends to give faster times. Since the required pulling force is inversely proportional to the diameter of the wheel, the pulling force is reduced 14% in going from a 26-inch wheel to a 30-inch one.

While I have shown and described herein certain embodiments of my invention, I intend to cover as well any change or modification therein which may be made without departing from its spirit and scope.

I claim as my invention:

1. A racing bike formed of two articulated parts, one of said parts including shafts leading to a horse together with seat means mounted on said shafts, the other of said parts including an inverted U-shaped frame hingedly joined to said first part and carrying wheels at its lower extremities of its inverted U-shaped configuration, means including devices of adjustable length for connecting the said lower extremities of said U-shaped frame to said shafts at said points ahead of said wheels, means for varying the length of said adjustable length means, means including apparatus mounted on one part adjacent to said seat and under the control of a driver mounted on said seat for controlling said length varying means to thereby vary the location of the center of gravity of said bike with the driver mounted thereon and means for detecting the extent to which said shafts are bowed upward or downward as a result of forces exerted by said shafts on said horse.

2. The racing bike of claim 1 wherein said devices of adjustable length each include first and second coaxial members threadedly engaging each other whereby rotattion of one with respect to the other will vary the length of the device.

3. The racing bike of claim 1 wherein said means for detecting comprises strain gage means mounted on at least one of said shafts, whereby the driver can observe the reading on the strain gage, note any vertical thrust exerted by said shafts on the horse, and then operate said means for controlling said length varying means to vary the center of gravity of the bike with the driver mounted thereon and thus the vertical thrust on the horse.

4. The racing bike of claim 1, characterized in that said bike includes at least four of said devices of adjustable length, two associated with each of said wheels, the two associated with a given one of said wheels being on opposite sides thereof, and each of said devices of adjustable length being controllable by the operation of said apparatus mounted on said one part adjacent to said seat and under the control of the driver mounted on said seat for controlling said length varying means, in such manner that each of said length varying means is operated simultaneously and to the same extent, whereby any tendency to cause one of said wheels to be turned outward or inward during the operation of said length varying means during the operation of the racing bike is essentially avoided.

5. The racing bike of claim 4, wherein the wheels of said bike are at least 30 inches in diameter.

References Cited

UNITED STATES PATENTS

| | | | |
|---|---|---|---|
| 507,839 | 10/1893 | Payne | 280—63 |
| 518,462 | 4/1894 | Loomis | 280—63 |
| 1,314,498 | 9/1919 | Bower | 280—63 |
| 2,896,962 | 7/1959 | Gaines et al. | 280—63 |

BENJAMIN HERSH, Primary Examiner

J. E. SIEGEL, Assistant Examiner